US011798286B2

(12) United States Patent
Faller et al.

(10) Patent No.: US 11,798,286 B2
(45) Date of Patent: Oct. 24, 2023

(54) TRACKING SYSTEM, ARRANGEMENT AND METHOD FOR TRACKING OBJECTS

(71) Applicant: OSRAM GmbH, Munich (DE)

(72) Inventors: Alexander Faller, Dachau (DE); Fabio Galasso, Rome (IT); Prasanth Kuncheerath Ramankutty, Munich (DE); Meltem Demirkus Brandlmaier, Munich (DE)

(73) Assignee: OSRAM GMBH, Munich (DE)

( * ) Notice: Subject to any disclaimer, the term of this patent is extended or adjusted under 35 U.S.C. 154(b) by 352 days.

(21) Appl. No.: 17/271,608

(22) PCT Filed: Aug. 8, 2019

(86) PCT No.: PCT/EP2019/071281
§ 371 (c)(1),
(2) Date: Feb. 26, 2021

(87) PCT Pub. No.: WO2020/043451
PCT Pub. Date: Mar. 5, 2020

(65) Prior Publication Data
US 2021/0342619 A1    Nov. 4, 2021

(30) Foreign Application Priority Data
Aug. 31, 2018 (DE) .................... 10 2018 214 844.9

(51) Int. Cl.
*G06V 20/52* (2022.01)
*G06T 7/292* (2017.01)
*H04N 7/18* (2006.01)

(52) U.S. Cl.
CPC .............. *G06V 20/53* (2022.01); *G06T 7/292* (2017.01); *G06T 2207/10016* (2013.01); *G06T 2207/30232* (2013.01); *H04N 7/181* (2013.01)

(58) Field of Classification Search
None
See application file for complete search history.

(56) References Cited

U.S. PATENT DOCUMENTS 5,465,115 A * 11/1995 Conrad .................... H04N 7/18
    348/170
8,098,888 B1 * 1/2012 Mummareddy ....... G06V 20/53
    382/103

(Continued)

OTHER PUBLICATIONS

Real-time Tracking and Fast Retrieval of Persons in Multiple Surveillance Cameras of a Shopping Mall. Bouma et al. (Year: 2013).*

(Continued)

*Primary Examiner* — Delomia L Gilliard
(74) *Attorney, Agent, or Firm* — VIERING JENTSCHURA & PARTNER MBB (57) ABSTRACT

A tracking system for tracking objects within a field of view is disclosed. The field of view may include a first zone and an adjacent zone of interest where at least two gates are associated with respective sides of the first zone within the field of view. The first camera is configured to detect when an object crosses one of the at least two gates and track the object throughout the first zone and the zone of interest. The tracking system is configured to generate a first event message in response to the object being tracked from one of the gates into the zone of interest and subsequently leaving the first zone through a dedicated gate of the at least two gates.

20 Claims, 7 Drawing Sheets

(56) References Cited

U.S. PATENT DOCUMENTS

| | | | |
|---|---|---|---|
| 2006/0279630 A1 | 12/2006 | Aggarwal et al. | |
| 2014/0160294 A1* | 6/2014 | Naylor | G08B 13/1961 |
| | | | 348/155 |
| 2016/0300246 A1 | 10/2016 | Apokatanidis et al. | |
| 2018/0061159 A1 | 3/2018 | Saso et al. | |
| 2020/0364999 A1* | 11/2020 | Mullins | H04N 7/181 |

OTHER PUBLICATIONS

Senior, Andrew et al., "Video analytics for retail", IEEE, Oct. 2007, pp. 423-428, Advanced Video and Signal Based Surveillance.

Bouma, Henri et al., "Real-time tracking and fast retrieval of persons in multiple surveillance cameras of a shopping mall", Society of Photo-Optical Instrumentation Engineers (SPIE), Apr. 2013, 13 pages, Proceedings of SPIE—The International Society for Optical Engineering, vol. 8756.

Shah, Mubarak et al., "Automated Visual Surveillance in Realistic Scenarios", IEEE, published on Jan. 15, 2007, pp. 30-39, IEEE MultiMedia, vol. 14, Issue 1.

International Search Report issued for the PCT patent application No. PCT/EP2019/071281, dated Nov. 8, 2019, 3 pages (for informational purpose only).

German Search Report issued for the DE patent application No. 10 2018 214 844.9, dated Aug. 1, 2019, 8 pages (for informational purpose only).

\* cited by examiner

TRACKING SYSTEM, ARRANGEMENT AND METHOD FOR TRACKING OBJECTS

CROSS-REFERENCE TO RELATED APPLICATIONS

The present application is a national stage entry according to 35 U.S.C. § 371 of PCT application No.: PCT/EP2019/071281 filed on Aug. 8, 2019; which claims priority to German Patent Application Serial No.: 10 2018 214 844.9 filed on Aug. 31, 2018; all of which are incorporated herein by reference in their entirety and for all purposes.

TECHNICAL FIELD

The present disclosure relates to a tracking system for tracking an object within a field of view and to a tracking arrangement comprising such tracking system. The disclosure also relates to a method for tracking an object.

BACKGROUND

Tracking systems are inter alia used to monitor or supervise certain areas. The tracking system recognizes objects, in particular persons entering or leaving the area under surveillance. More sophisticated tracking systems are also capable of tracking moving objects throughout its movement within the area under surveillance.

In some applications, for instance in retailer shops, supermarkets, stores, warehouses monitoring the area is used for additional purposes. For example, shop retailers may be interested in a more detailed knowledge about the customer flow in or out certain areas to improve their offer, direct customers to specific offers or ensure the best use of the available space. For such purpose, specific identification of individual persons are not always required. On the other hand, such systems should provide the capability for tracking several objects at once within a predefined area and to provide respective signals for statistical and analytical purposes.

SUMMARY

This need and other desires are met with the subject matter of the present independent claims. Further aspects and various embodiment are found in the dependent claims.

The following presents several aspects of a tracking system for tracking an object within the field of view. The field of view may comprise a first zone and an adjacent zone of interest. At least two gates are associated with the respective sides of the first zone within the field of view. The tracking system comprises a first camera that is adapted to detect when an object crosses one of the at least two gates. The camera is further configured to track the object throughout the first zone and zone of interest. The tracking system is adapted to generate the first event message in response to the object being tracked from one of the gates into the zone of interest and subsequently leaving the first zone through a dedicated gate of the at least two gates. In other words, the tracking system according to the proposed principle is further configured to detect the presence of an object within the zone of interest and connect such detection with a subsequent event, namely when the object leaves through a dedicated gate within the first zone.

In the case of the object to being a person, the tracking system is therefore able to associate a decision of the person, for instance, leaving the first zone through a dedicated gate with a previous event, namely the detection and tracking of the person within the zone of interest.

In this regard, the expression "gate" is not related to physical gate of some sort, but rather a virtual line or area upon a side of the zone under surveillance by the camera. In other words, a border side of the area under surveillance by the camera is defined as such a "gate". The camera is configured to detect and recognize an object crossing that border side and consequently the gate. In some other instances, a gate can be formed just by a simple line on the ground within the field of view. The camera can recognize such line and consequently a person crossing the line. Likewise, the expression "crossing" can have various meaning in the context of the present application. Such meaning can include entering or leaving the respective zone. Consequently, the crossing is linked to a direction of the crossing that is into the zone or out of the zone.

In a further aspect of the gates are associated with the respective sides of the first zone not adjacent to the zone of interest. For example, each of the respective side of the first zone not adjacent to the zone of interest can be defined as a gate. In addition, or are alternatively, a gate can be associated with the side of the zone of interest opposite the first zone. In some further aspects, the first camera may be adapted to detect the crossing of an object through the gates, and particular through the gate that is associated with the side of the zone of interest. Such embodiment enables the detection and subsequently tracking of an object entering the first zone or the zone of interest from various possible sides.

In some aspects of the zone of interest to can be adjacent to an area, which is blocked for movement; that is no movement into that area is possible. Any blocked side may not associated with a gate. Consequently, each side of the first zone and the zone of interest that can be crossed can be associated with a gate. In some aspects, the camera is therefore configured to detect entering or leaving the first zone and the zone of interest from any side possible and not blocked.

In some aspects, the dedicated gate of the at least two gates can be substantially perpendicular towards the side of the first zone adjacent to the zone of interest. Hence, in some aspects of the dedicated gate can be arranged in parallel and next to the blocked area. This may be useful in instances, in which the way the object is using after leaving the zone of interest is relevant for subsequent processing and conclusions.

Further aspects relates to a more sophisticated tracking system. In an aspect, the first camera is also configured to a second zone within the field of view. The second zone is not overlapping with the first zone, but adjacent to the zone of interest. The first camera is adapted to detect when an object crosses the second zone through one of at least two gates associated with respective sides of the second zone. The camera is also adapted to track the object throughout the second zone and to the zone of interest.

The tracking the system in such embodiment is configured to detect or recognize when an object crosses one of the first and second zones and subsequently tracks the object throughout the zones. In particular, the tracking system is configured to track the object throughout one of the first zone, the second zone, and the zone of interest including a passing through the zone of interest.

In an alternative aspect, the tracking system may comprise an additional second camera, which is configured to monitor the zone of interest and the second zone within the field of view. Consequently, the tracking systems can be configured to track objects within a field of view, which contains various zones adjacent to a common zone of interest. The various zones can be monitored by a single camera or by two or more cameras as also described below in more detail.

A gates associated with respective sides of the second zone may not be adjacent to the zone of interest. An additional gate may be defined and associate it with a side of the zone of interest opposite the second zone. Hence, the zone of interest may comprise at least two gates, both gates defined on the side of the zone of interest opposite the first and second zone, respectively.

In a further aspect, the tracking system is configured to generate a second event message. Such second event message is generated or generated in response to the object being tracked from one of the gates into the zone of interest and subsequently leaving the second zone through a dedicated gate of the at least two gates associated with respective sides of the second zone.

In such embodiment, the tracking system is configured to generate the first and the second event message. Such event message indicates whether an object enters the zone of interest and subsequently leaves the zone of interest through one of the dedicated two gates. If the object is a person, the tracking system will be able to link a decision of the person, namely the crossing through a dedicated gate to the person's previous presence within the zone of interest. The tracking system therefore provides with one or two cameras multiple gate crossing in connection with the functional correlation between the crossing of the gate and staying within the zone of interest.

In a further aspect, the tracking system may be configured to provide a third event message. The third event message can be generated upon various events, for example, when an object enters one of the first zone, the second zone, or the zone of interest through one of the gates. Another third event message can be generated when an object remains within the zone of interest for a certain period. Likewise, when object leaves the first zone or the second zone through a gate not being there dedicated gate, a third event message can be generated. It is possible with such event messages to provide necessary information for statistical purposes when tracking an object throughout the first zone, the second zone and the zone of interest.

Another aspect deals with the issue of tracking and monitoring various objects throughout the field of view and distinguish those objects when entering or leaving through the gates of the respective zones. In some instances, at least one of the cameras is configured to associate at least two attributes to an object to recognize the object from another object within the respective zones. The association of attributes to a certain object enables the camera to track the object throughout its movement within the zones. It further enables the camera to distinguish between different objects, thereby generating the correct event messages.

In some instances, certain specific objects shall be ignored. For this purpose, the tracking system and/or the cameras may be configured to forego the creation of an event message in response to detecting a predefined object or in response to detecting one or more predefined attributes associated with the object. Hence, the tracking system will not generate an event message when such detected object enters the zone of interest and subsequently leaves through one of the dedicated gates. Even further, the tracking system may forego any tracking at all and not generate any event message is such predefined object or such predefined attributes are recognized.

The attributes may include the color of at least a part of the object, a certain pattern of at least a part of the object, signs attached to the objects or physical parameters like height or size. In some instances and in case where the object is a person, the attributes are related to the appearance of the person. This include for example hair color, eye color, height, certain parameter of the clothes, like color or pattern, gender or other attributes distinguishing one person from a second person. In such cases, certain object attached to the person can be identified by the tracking system causing to ignore the person. This approach is useful to avoid tracking of staff personnel within the zones and generating false event messages.

Another aspect is related to the creation of event messages and its content. Such event message can comprise a timestamp when the event occurred as well as camera identification or other location information. The event message may also comprise the crossing and direction of the object, for instance, whether the object leaves or enters the zone through the respective gate. In some application, particularly for statistical or analytical purposes, an individual identification is not necessary, that is the person shall be recognizable but not identifiable. Hence, the event message may include a recognition tag to the object to recognize the object at a later stage. The identifier can be derived from attributes associated with the object and/or certain information about the object as well as the movement direction within the respective zones.

The event messages generated by the tracking system are used for further processing. Hence, not each information generated by the camera and the tracking system throughout the movement of an object within the field of view is processed, but only specific signals are generated in response to specific events within the system. For example, an object moving into the first zone and then leaving through a gate may not generate an event message of interest, because the object has not stayed or entered the zone of interest. Likewise, an object entering the zone of interest and then leaving through a non-dedicated gate will not cause the generation of an event message.

In some aspects, a tracking system for tracking an object in a field of view is proposed, wherein the field of view comprises at least one zone and at least one gate. The gate is associated with a respective side of the at least one zone. A camera that is adapted to monitor the field of view and detects when an object crosses the at least one gate. It may track the object throughout the at least one zone. In response tracking a person within the zone and subsequently leaving the zone through the at least one gate associated with it, the tracking system is adapted to generate a first event message.

A different aspect deals with the tracking arrangement comprising a plurality of tracking systems, wherein the respective fields of view for each tracking system do not overlap. A data processing system is configured to receive a plurality of signal events of the plurality of tracking systems to obtain a statistical analysis of objects within the respective fields of view. The respective fields of view of each tracking system may comprise a distance towards each other. In other words, a tracking arrangement also comprises a plurality of areas not being monitored by the tracking systems. The fields of view may not be adjacent to each other. Such tracking arrangement can be for example implemented in retail shops, supermarkets, warehoused and the like, in which customers or persons shall be monitored to obtain certain behavior. The one or more tracking systems can therefore be arranged in a regular structure, particularly in a chessboard or matrix like structure. In case of the above-mentioned shops or other open available locations, certain areas may be occupied by shelfs or other obstacles. Such blocked areas are generally not relevant for monitoring and hence free of any zones. In certain shops for example, shelfs may be arranged in rows and columns; and the tracking systems of a tracking arrangement may be arranged between the rows and columns.

A further aspect relates to a method for tracking objects within the field of view. The field of view may comprise a first zone and an adjacent zone of interest. At least two gates are associated with the respective sides of the first zone within the field of view in accordance with the proposed principle, the method comprises the step of detecting when an object crosses one of the at least two gates associated with the first zone. The object is subsequently tracked throughout its movement within the first zone and the zone of interest. A first event message is generated in response to the object being tracked from one of the gates into the zone of interest and subsequently leaving the first zone through a dedicated gate of the at least two gates.

The method therefore generates a first event message when an object is recognized to be first within the zone of interest, and then subsequently leaving the first zone through the dedicated gate.

In some instances, the gates are associated with respective sides of the first zone adjacent to the zone of interest. A further gate can be associated with a side of the zone of interest opposite the first zone. In some occurrences, an object can be detected when it enters the first zone or zone of interest from any side possible.

In a further aspect, an object is detected when it enters a second zone within the field of view. The second zone does not overlap with the first zone. The second zone may also be adjacent to the zone of interest. An object is detected and recognized, when it crosses at least one of two gates associated with the second zone. The object is tracked throughout it movement within the second zone and the zone of interest. In some instances however, the first zone and the second zone can be located adjacent to each other thereby forming a single large zone As a further aspect, a second event message is generated in response to the object being tracked from one of the gates into the zone of interest and subsequently leaving the second zone through a dedicated gate of the at least two gates associated with respective sides of the second zone.

In some aspects, the method for tracking and object within the field of view comprises the step of detecting an object when it enters a zone of interest within the field of view and generating the first event message when the object subsequently leaves through a specific first gate and generating a second event message when the object leaves through a dedicated second date.

In some instances, the dedicated gate of the at least two gates associated with respective side of the first zone or the dedicated gate of the at least two gates associated with the respective side of the second zone is substantially perpendicular towards the side of the second zone adjacent to the respective zone of interest. It may occur the zone of interest is adjacent to an area that is blocked for movement. Then, the dedicated gate may be arranged starting on the edges of the area.

Apart from the first and second signals, various other third event messages can be generated. For example, when an object enters one of the first zone, the second zone, and the zone of interest via one of the gates, a respective entering event message can be generated. When the object stays within is a zone of interest by on a predefined threshold of time, a respective event message can also be generated. Further, when an object leaves the first zone or the second zone from the zone of interest through a gate not to being the dedicated gate and event message can be generated.

Another aspect relates to the identification or recognition of objects when it crosses the gate or enters one of the first zone, the second zone and the zone of interest, respectively. At least one attribute can be associated to an object to recognize or distinguish the object from another different object. The attribute can also be used when the event message including the attribute is processed further. Such attribute can include the color of at least part of the object, a pattern, signs attached to the object or physical parameters like height or size.

In some instances, the step of detecting when an object crosses the gate can include a detection of a predefined object, or a detection of one or more predefined attributes associated with the object. In response to detecting such predefined object or in response to detecting one or more predefined attributes associated with the object, the step of generating an event message is foregone. In other words, the method will not generate an event message when a predefined object or a specific attribute associated with the object is detected. This may be useful if the object is a specific person, for example staff personnel working in a shop and the like. In such case, the method then foregoes the step of generating an event message when specific attributes associated with personnel of the shop are recognized. In a further aspect, even the tracking can be stopped, when an object or a person comprises a specific attribute. The detection of objects marked with an attribute causing the object "not to be tracked" can reduce the overall processing time and decrease the technical requirements. Suitable attributes for object to prevent the tracking and/or generation of event messages can include specific signs or patterns attached to the object.

Other aspects related to the content of event messages. In an aspect, the event message may include a timestamp when the event occurred, or a camera identification to locate the position of the event. This allows specifically identifying the event and linking the event to a dedicated location. Further, the event message may include attributes associated with the object, or an identifier of the object. If no individual identification of an object is required, an anonymous identifier assigned to the object may be sufficient. Further, the direction of the crossing of the object within the respective zones all the direction of the object during the event may also be included in the event message.

In some further aspects, the event messages being generated are used for further processing and in particular for various statistical and analytical calculations and visualizations. For this purpose, only the relevant event messages are used, but not necessarily each signal or possible event. For example, an object leaving the zone of interest and the first or second zone not through one of the dedicated gate is of lower interest and subsequently such event may not be further processed.

Some aspects concerning a method for tracking an object in a field of view are proposed, wherein the field of view comprises at least one zone and at least one gate. The gate is associated with a respective side of the at least one zone. The method comprises the step of detecting when an object crosses the at least one gate associated with the at least one zone. The object is subsequently tracked throughout its movement within the zone and the zone of interest. A first event message is generated in response to the object being tracked within the zone and subsequently leaving the zone through the at least one gate associated with the at least one zone.

BRIEF DESCRIPTION OF THE DRAWINGS

The accompanying drawings serve to provide an understanding of non-limiting embodiments. The drawings illustrate non-limiting embodiments and, together with the description, serve to explain them. Further non-limiting embodiments and many of the intended advantages will become apparent directly from the following detailed description. The elements and structures shown in the drawings are not necessarily shown to scale relative to each other.

Identical, equivalent or equivalently acting elements are indicated with the same reference numerals in the figures. The figures are schematic illustrations and thus not necessarily true to scale. Comparatively small elements and particularly layer thicknesses can rather be illustrated exaggeratedly large for the purpose of better clarification.

DETAILED DESCRIPTION

In the following description, several exemplary embodiments illustrating various aspects of the proposed principles are presented. These aspects can be combined in different ways by the skilled person and may differ from the specific examples disclosed herein without deviating from the inventive concept.

When monitoring a certain area, a camera comprises a defined field of view. The field of view is defined as the area in space a camera is able to capture in a single (or multiple) shot(s). A zone is defined as at least a portion of the field of view. The zone may be as large as the field of view captured by the camera or may be smaller than the field if view. There may be several zones included in a field of view, and consequently the camera may be configured to capture and monitor several zones. Defining a zone, which is slightly smaller than the field of view may be beneficial in some instances. For example, distortions due to the edges of the field of view and caused by lenses distortion or processing glitches can be avoided. The zone then becomes a portion of the field of view, in which the camera is able to detect or capture a certain object and track them. In some instances, the camera may also be configured to capture multiple objects and track them individually.

In this regard, the expression "tracking an object" shall mean that the camera and its processors associated with it is able to follow an object and its movement throughout the respective zone. Hence, the camera is configured to detect the position and any movement vector of the object. In some instances, the camera is able to detect an object outside the zone, but will follow and also process any information further only when the object is within the respective zone.

Figure 1:
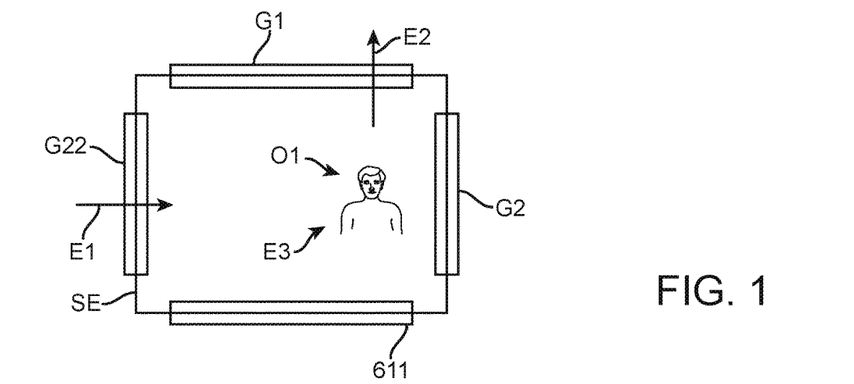
FIG. 1 shows a non-limiting embodiment of a zone in accordance with some principles of the present disclosure.

FIG. 1 shows an example of a zone monitored by a camera (not illustrated). In this example, the zone is rectangular and limited by its four side edges SE. Each of the side edges is associated with a Gate G1 to G4 illustrated herein as a rectangle superimposed onto the side edges. In some instances, the respective gates may comprise the same length as the side edges. In this example the gates G1, G2 and the opposite gates G11 and G22 are slightly shorter than the sides of the zone, although it may not matter for practical purposes.

The term "gate" defines an area along the side of the zone, at which the capturing and tracking functionality of the camera is triggered when an object crosses the gate. The gate in this example is a virtual line within the field of view of the camera, defined for instance by certain pixels within the camera's light sensor. In other embodiments, such lines can be drawn on the ground in a specific color, which can be recognized by the camera. When an object crosses the gate area along the side, some functionality of the camera and its processing system is triggered. In some instances the gate is substantially the side limits of the respective zone. Hence, when an object crosses the limits, certain functionality of the camera is triggered, including but not limited to the capturing, recognition and tracking functionality.

Figure 2:
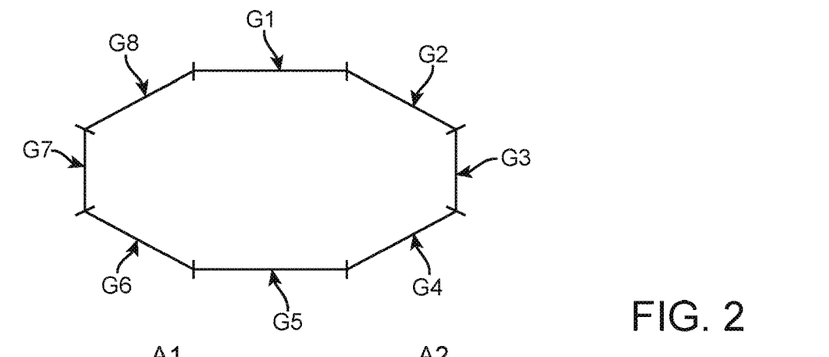
FIG. 2 illustrates shows another embodiment of a zone.

The zone in FIG. 1 has four gates along the side limits of the zone, however other geometries for such zones can be chosen depending on the needs and limitations. FIG. 2 illustrates a different example for a zone with octagonal shape. Gates are arranged on each sides of the octagonal shaped zone. Having more sides and gate may provide a benefit as the gate also provides some information about the moving vector at the instance an object enters or leaves the zone. Hence, defining more gates along the side of a zone provides more detailed information about the location of the crossing as well as potential information about the moving vector.

Referring back to FIG. 1, an object O1 is located within the zone and tracked by the camera. Upon entering the zone via one of the gates, for example via gate G22, the camera may create an event message E1. Likewise, the camera may generate and event message E2 when object O1 is leaving through gate G1. Hence, in some instances the camera is configured to create an event message when an object crosses one of the gates. Such event messages E1 and D2 can also include the moving vector that is whether the object enters the zone or leaves the zone. Likewise, the camera is configured to track the object during any movement within the zone. Accordingly, the camera may be configured in some instances to generate an event message E3 including information about the object within the zone. Such event message E3 can be generated to specific points in time such that it becomes possible to evaluate the length of stay within the zone.

Figure 3:
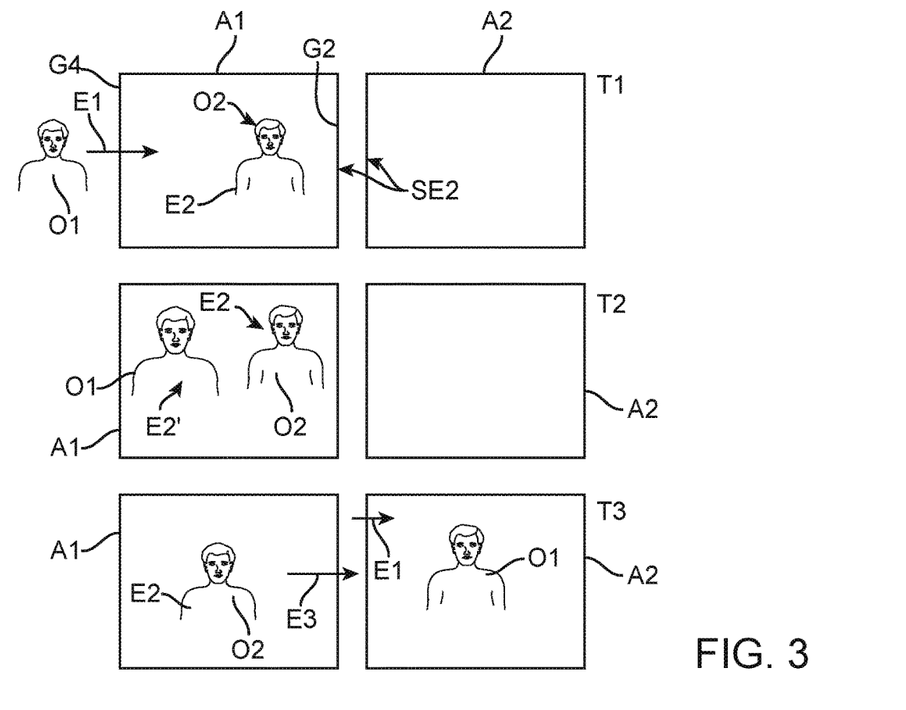
FIG. 3 shows a non-limiting embodiment of generating events when tracking objects across several zones.

The camera in the exemplary embodiment of FIG. 1 is configured to generate only specific event message associated with entering and leaving a zone as well as providing information about the length of stay. An exemplary embodiment of two zones being adjacent to each other is shown in FIG. 3. The zone are under surveillance by two cameras at three times T1, T2 and T3 illustrate the tracking of multiple objects and generation of respective event messages.

Two zones A1 and A2 are arranged adjacent to each other along a common side SE2. During time T1, a first object O2 is located within the first zone A1. Within a certain time frame prior to time T2, a second object enters zone Z1 through gate G4, thus generating the "enter" event message E1. Event message E1 includes information about the time, the gate and the event type. Likewise, the camera may generate event E2 to indicate that object O2 has stayed within zone A1 during time T1. During this time, zone A2 is empty. The camera monitoring zone A2 will therefore not create any event message in this embodiment Moving forward to time T2, the camera monitoring zone A1 tracks the objects O1 and O2 throughout its movement within the respective zone. Both objects remain within the zone and do not leave through any of the gates. Hence, the camera monitoring zone A1 generates event E2 for object O2 and event E2 for object O1. As explained further below in detail, the camera is configured to recognize and distinguish between the two objects.

At time T3, object O1 have left zone A1 through the gate adjacent to zone A2 and entered zone A2. Object O2 remains within zone A1. Consequently, the camera monitoring zone A1 will generate an event message E2 indicating that object O2 has remained within zone A1 for a specific time. In addition, the camera generates a second event message E3 when object O1 leaves zone A1 through one of the respective gates. Likewise, the camera monitoring zone A2 will generate an event message upon the entering of object O1 into zone A2. The cameras in this example are configured for multiple gate crossing to track multiple object within the respective zone to be monitored.

In an alternative embodiment also related to FIG. 3, zones A1 and A2 are monitored by the same camera. At such occurrence, the camera may for instance only generate at time T3 one of the signals E3 or E1 to indicate that object O1 has entered zone A2. If an object (not shown) leaves zone A1 through another gate not adjacent zone A2, a further event message indicating such crossing may be generated.

Figure 4:
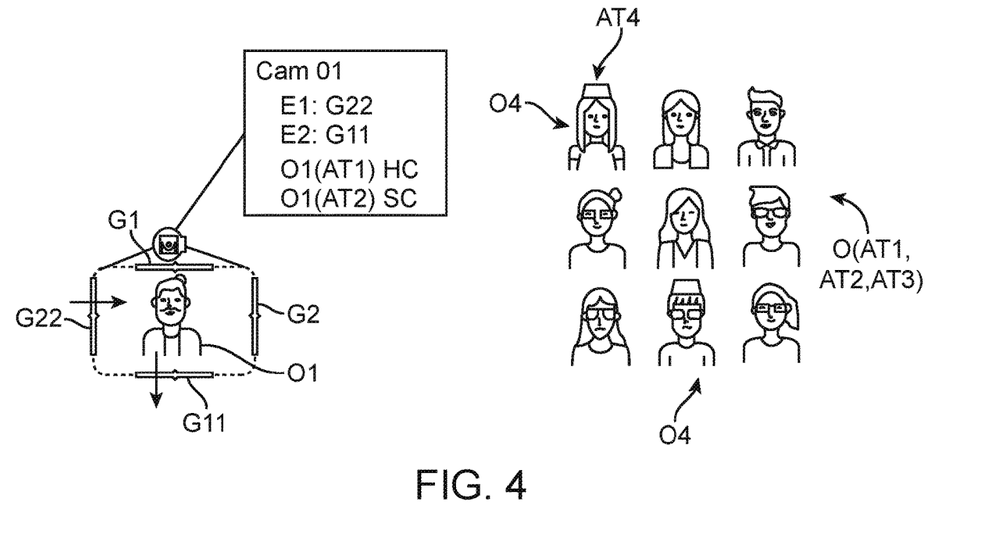
FIG. 4 shows a non-limiting illustration of content in an event message including the recognition of object in accordance with some aspects of the present disclosure.

FIG. 4 shows some illustration related to the content of an event message as well as some further aspects. When tracking an object, the camera is enable to recognize an object and to follow the object during its movement throughout the zone. While for a single object it may be sufficient, to simply track any movement, e.g. by recognizing a change in pixel color over time, a more sophisticated approach is required, if the camera tracks more than a single object within its zone and its field of view, respectively. Furthermore, it may be beneficial in some instances to be able to distinguish between different objects. This requirement can also be seen in FIG. 3, in which one of the two object is leaving from zone A1 to zone A2. Without being able to distinguish between objects O1 and O2 in FIG. 3, the camera is not able to provide which object is staying within the zone.

Referring back to FIG. 4, object O2 has entered zone monitored by the camera via the gate G22, causing the camera to generate a first event message. Subsequently the object, in this case a person leaves through gate G11 and the cameras generate a new signal. The content of such signals are also presented as signals E1 and D2. In addition to this information, the camera is also configured to recognize certain attributes AT1 and AT2 of the object being tracked and associate these attributes with the object. When generating the event message, the attributes are included in the signal enabling to associate certain event to certain objects.

In this case, in which the object is a person, the two exemplary attributes used for recognizing the object is the hair color HC and the shirt color SC. When more attributes are used for recognition of the object, the tracking is improved and the risk for failure in distinguishing a plurality of objects or persons is reduced.

The right part of FIG. 4 illustrates such principle in detail. The objects being recognized are persons with different attributes like hair color, hair length, eye color, certain cloth and so on. Recognizing a person by such attributes does not identify the individual, but enables to distinguish between those persons when entering or leaving a zone. In the example, each person is recognized by a plurality of Attributes AT1, AT2 and AT3. As each attribute can have different values, the combination of the different values provide enough information to distinguish the persons. For example the first attribute may be the hair color, the second attribute may include whether the person wears glasses or not and the last attribute includes a pattern and color on the cloth. In some instances, the camera is configured to recognize one or more attributes of an object when it enters the zone. Those attributes include size and color. Also just parts of an object can be define as an attribute. The camera subsequently assigns one or more of the attributes to the object, such that the object become recognizable and distinguishable from each other.

The various attributes assigned to each object support recognition throughout movement within the zone, even when persons are exchanging places or multiple persons are located close to each other. In some instances, dedicated and special attributes are defined. These attributes shall provide additional information to the camera and are not just for distinguishing the persons. In the example of FIG. 4, some person are wearing a hat AT4, marking them as staff members. By evaluating the attribute hair color, the camera is able to recognize a staff member and distinguish such person from another person. Upon recognition of a staff member, the camera may forego any further tracking and particularly ignore movement of such object when entering or leaving the zone. Such recognition of dedicated attributes is useful for certain applications, when some objects shall be ignored when information about the tacking process is further processed.

Figure 5:
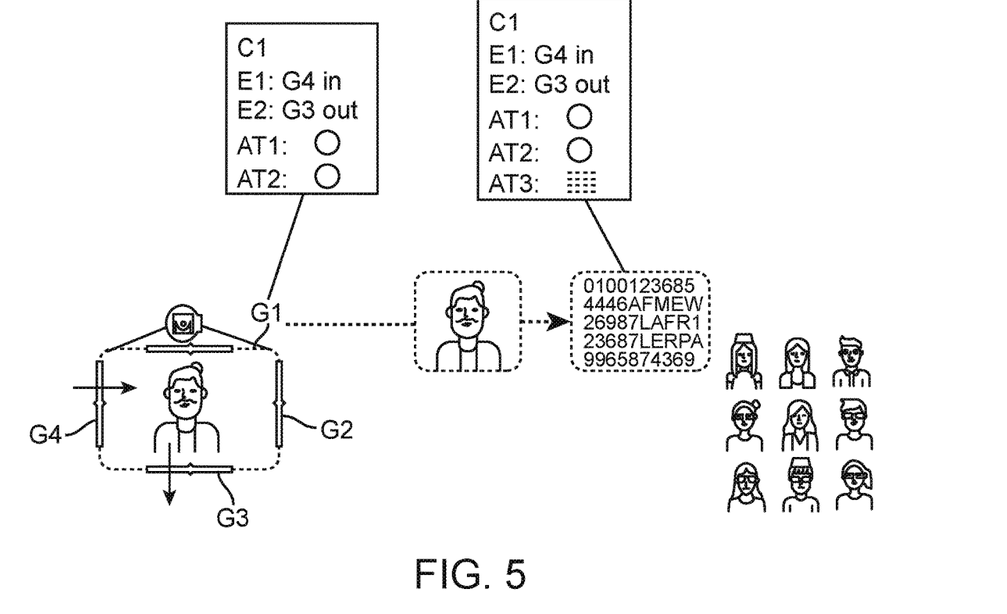
FIG. 5 illustrates content in an event message according to some aspects.

FIG. 5 illustrates a similar example. In this example, the camera detects a plurality of different attributes and evaluates them together to obtain a unique identifier. Such identifier does not relate to the individual person, but provides an attribute for recognizing the person. In a simple example, the attribute AT3 can include an indication to ignore the object or to not use the object for any further processing or evaluation. The attribute AT3 can include values of attributes AT1 and AT2 also included in the event message.

Figure 6:
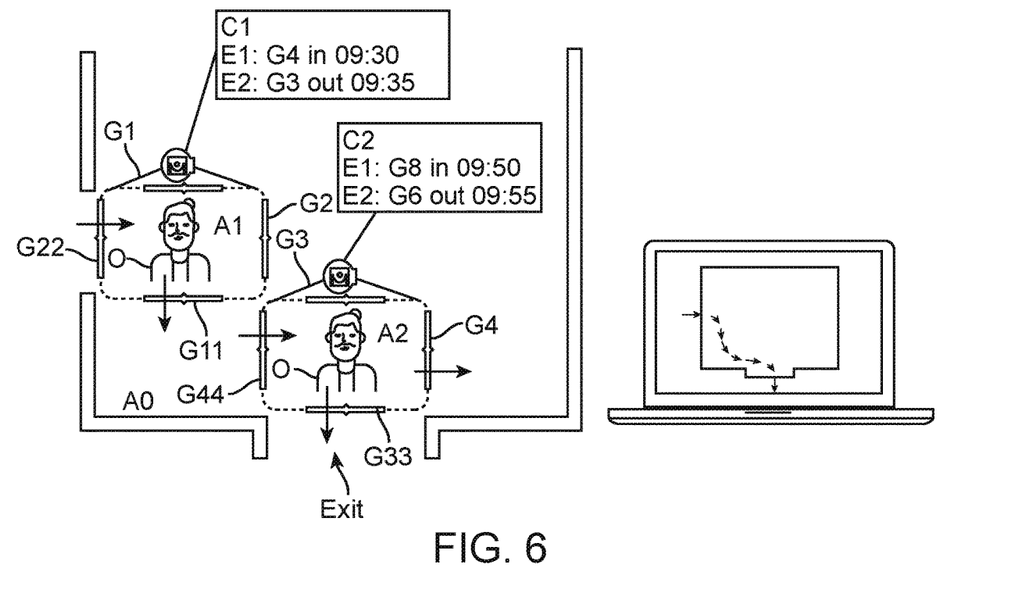
FIG. 6 shows a non-limiting embodiment of some aspects of a tracking arrangement.

FIG. 6 illustrates an embodiment disclosing various aspects according to the proposed principle, in which tracking of object and assigning attributes to them is combined with an evaluation of the movement through a larger area. In this exemplary and non-limiting embodiment, statistics shall be provided to evaluate how often person are using the area for simply going from the entry to the exit point. The area to be monitored is limited by several walls, of which two are shown herein. Each illustrated wall has an entry or exit, through which person can move. In addition, two zones are defined in front of the respective openings in the wall. Zone A1 is located with its gate G22 in front of the first entry; zone A2 is located with its gate G33 in front of the second entry. A person O enters zone A1 through gate G22 causing the camera to trigger an event E1 including information about the time at which the event occurred. In addition, the camera C1 detect certain attributes and assigns them to the object to render the object recognizable. The event E1 is stored within the camera for later transmission to a processing system for further processing. The object subsequently leaves through gate G11 triggering a respective event in camera C1. In the present example, such event may also be forwarded to the processing system for the statistical evaluation as outlined further below. At a later point in time, object O1 enters zone A2 via gate G44. Camera C2 detect the attributes and assigns the respective attribute values to object O1. Finally, object O2 leaves through dedicated gate G33 at a certain time causing camera C2 to generate event E4. Upon recognition that the object has left through gate G33, camera C1 and camera C2 transmit the event related to this object to the processing system.

Combining these events enable to track an object through the overall area without the need to have precise information about the location at each point in time. The processing system can use the event all assigned to the same object O1 (due to recognition of the attributes with the same values) and visualize its trace through the area.

In an alternative example, the object may leave zone A2 through gate G4 instead of gate G22. In such case, an event may be generated, but cameras C1 and C2 may forego to send an event message to the processing system, because the object is considered to have no longer the purpose of leaving the area and is therefore not considered relevant.

The presented approach provides multiple gate counting combined with the identification of an object crossing a dedicated specific gate without the need of keeping the record of the individual movement. For example using the time stamps of event E2 and event E3, the processing system can evaluate how long a person is remaining with a certain area even if this area is not under surveillance. If this area is a zone of interest, one can evaluate whether a person entering such zone of interest actually builds up some interest and subsequently leaves through a dedicated gate to confirm such interest.

In an alternative embodiment also illustrated in FIG. 6, area A0 is considered a zone of interest advertising and encouraging a person to leave through the lower exit and gate G33. Combining the different events of entry and exit one of zone A1 and A2) and assigned to the same person, it becomes possible to statistically evaluate how many persons stay within the zone of interest and subsequently leave through the advertised gate. In the presented example, one can assume that a person may have interest, if it leaves the area subsequently through gate G33.

Figure 7:
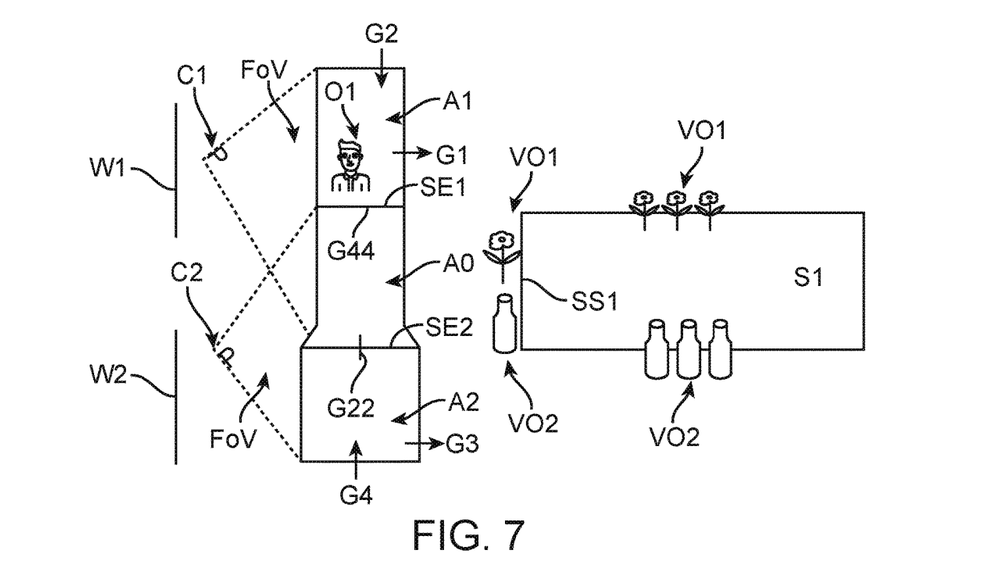
FIG. 7 illustrates shows a non-limiting embodiment of another tracking system according to some aspects of the present disclosure.

FIG. 7 illustrates a further embodiment. It shows an area which is limited on one side with walls W1 and W2 having an opening in between. Two cameras C1 and C2 are installed, each camera comprising a field of view FoV. As indicated the field of views of both cameras do overlap each other. The field of view of the first camera C1 comprises two zones, namely zone A1 and zone A0 further referred to herein as a zone of interest A0. Zone 1A is adjacent to the zone of interest, and both zones share a common side SE1. The field v view for camera C2 also defines two zones, referred to as zone A2 and zone A0. The zone A0 of cameras C1 and C2 are a common zone, hence both cameras share the same common zone of interest. Similar to the zone of camera C1, zone Z2 is adjacent to the zone of interest A0 with a common border SE2. However, zone A2 does not overlap with zone A1, neither do the share a common side.

Zone A1 defines a plurality of gates G1, G2 along its sides. Gate G2 is arranged opposite the zone of interest, Gate G1 is defined along one of the sideways and substantially perpendicular to side SE1. Gate 22 is located at the side of zones A0 opposite zone A1. Similar gates G4, G3 and G44 are defined within zone A2 and zone of interest A0 for the second camera. The zone of interest therefore comprises two gates, each gate belonging to a different field of view and different camera.

A shelf S1 is located adjacent to one side of the common zone of interest. The shelf is accessible from both sides, which contain several different products offered to potential buyers. These products V01 and V02 are available in respective aisles on each side of the shelfs. Accessing these aisles by a person is possible via Gates G3 and gate G1, respectively. Shelf S1 also comprises a shorter side SS1, which is directly adjacent to the zone of interest and may contain a combination of special offers for products available along the longer sides of the shelf. For example a subset of product VO1 and VO2 are provided on the shelf S1 on its shorter side SS1 indicating the position of further or additional products on the shelf. A person within the zone of interest can study the special offers being presented within or adjacent to the zone of interest and then decide whether he wants to have further studies on the respective shell side. The person subsequently may step through gate G1 or gate G3 in dependence of his decision. If the person is not interested, he may continue and exit the zones A0 to A2 via another gate for example.

Camera C1 is configured to detect a person entering through one of the gates into zone A1 or A0 (that is for example gates G1, G2 or G22) and track the person's movement throughout the zone A1 and A0. Attributes are detected by the camera when the person enters the zones. The attributes are assigned to the person to be able to recognize the person throughout movement in the respective zones and for later processing. Further, using attributes the camera is configured to detect multiple persons within the zones and track their movements If the person directly leaves zone A1, it is assumed that the person has not recognized the offer or may not be interested in it. The camera C1 may not store the movement of such person. In some instances, the camera may submit a signal for later processing indicating that a person moved through the zone. This may be useful for statistical purposes. In some other examples, a person entering zone A1 continues its movement into the zone of interest. Camera C1 tracks its movement within the zone of interest and obtains for example the period of stay within the zone of interest.

Similar functionality is provided by camera C2. When the person in the above given example enters from zone A1 into the zone of interest, it crosses gate G44. The gate crossing is recognized by camera C2. Hence, both cameras now track the person's movement within zone A0. The person will leave eventually the zone of interest into zone A1 or A2 and subsequently leave such zones as well.

Depending on the specific path, the person will take several different event message may be possible. In some instances, when the person has stayed within the zone of interest and leaves through one of the dedicated gate G1 and G3 into one of the aisles and even message may be generated by the tracking system indicating a potential interest in one of the products offered in or at the zone of interest. If the person leaves through a non-dedicated gate, an event message may be generated indicating no interest for the object.

The event message may contain different kinds of information. In some instances, it may contain time and gate of entry into one of the zones as well as the leaving gate. In other instances, the event message may also comprise information about the period in which the person remained within the zone of interest.

The Table below shows possible event messages including the type of even signal depending on the various path a person may have taken.

| No camera | Entry gate | Exit gate | Stay within zone of interest | Interest in offer |
|---|---|---|---|---|
| 1 C1 | G2 at 09:05 | G2 at 09:05 | No | No |
| 2 C1 | G2 at 09:06 | G1 at 09:08 | Yes | Yes |
| 3 C1 | G22 at 09:10 | G1 at 09:12 | Yes | Yes |
| 4 C2 | G4 at 09:10 | G44 at 09:12 | Yes | No |
| 5 C2 | G4 at 09:12 | G44 at 09:12 | Yes | No |
| 6 C1 | G22 at 09:12 | G2 at 09:13 | No | No |
| 7 C7 | G4 at 09:25 | G3 at 09:25 | No | Inconclusive |

In row 2, camera C1 has recorded an entry event and tracks the person to the zone of interest in which it stays for a certain period. The person then leaves through gate G1, thereby presumably having interest in product VO1. In row 4, camera C2 has detected and recognized a person entering via gate 4 and moving on to the zone of interest. At the same time. Camera C1 in row 3 records an entry at 09:10 via gate G22 of the same person (i.e. having the same attributes) and tracks the person within the zone of interest. The person leaves at 09:12 through gate G44 as recorded by camera C2. Camera C1 records a "leave event" at the same time by the same object. As a result thereof, camera C1 may transfer the information in rows 1 and 3 for further processing as a positive event that is an event in which a potential interest of the offers can be assumed.

Likewise, rows 5 and 6 indicate a similar movement with the difference that the person leaves after staying in the zone of interest through a non-dedicated gate. Camera C1 may issue row 6 as a negative event indicating that although the person stayed within the zone of interest for some time it seems to show no further interest in the offers.

The event in row 1 may not be transmitted at all, because the person entering through gate G2. The events in row 7 may be inconclusive, because the person was entering via gate G4 and moved directly to gate G3 without staying in the zone of interest. While the person may be interest in the products VO2, it seems that the special offer presented in the zone of interest has not drawn attention and the person was not triggered by those.

The tracking system of the present disclosure collect and process information about potential customer behavior without the need of identifying the customer individually. Rather it provides some statistical information if and to what extent a customer may be affect by a special offer presented in a zone of interest such that the customer after staying for a certain period of time within the zone decides to move into an area, that provides further or additional product similar to the special offer. Retail shops, warehouse and supermarkets are able to evaluate the result of certain marketing actions. Further, it allows drawing conclusion concerning customer flow in response to presentation of various kinds of products. It is possible to obtain the impact of advertisements or special offers and subsequent sales. Using such method of multiple gate counting in combination with time measurement of staying in a zone of interest provides an efficient way to obtain statistical information.

Figure 8:
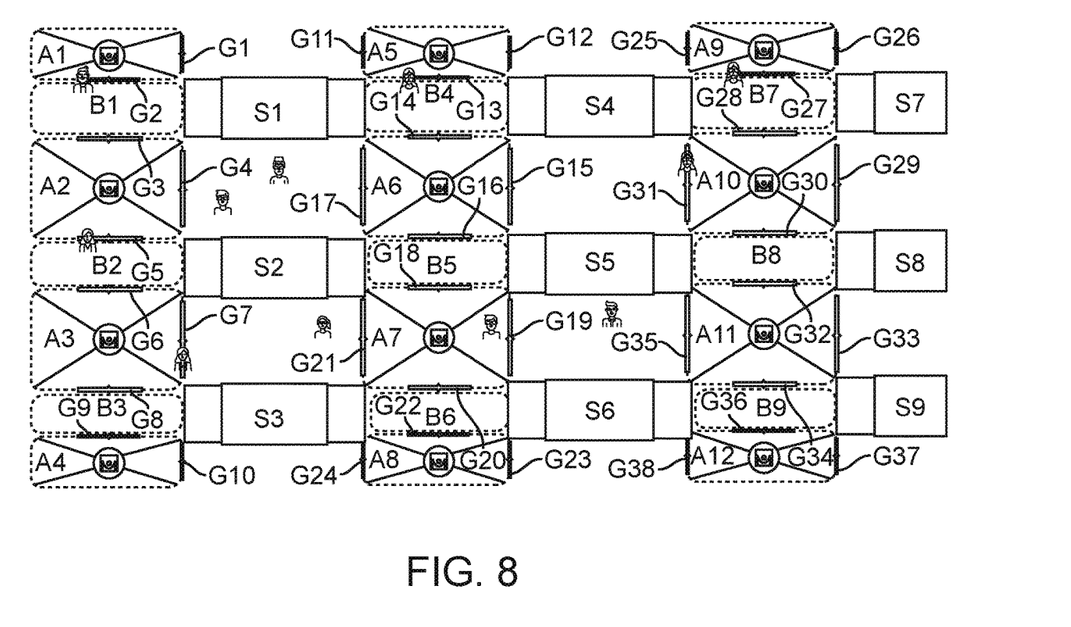
FIG. 8 illustrates a non-limiting embodiment of some aspects of a tracking arrangement.

FIG. 8 shows a schematic top view of an area of a warehouse or a supermarket under surveillance. It contains several shelfs S1 to S9 with different kinds of products offered for sale. The shelfs are separated by respective aisles, such that customers can move between the shelfs and access the compartments from both sides. At each crossing of a vertical aisle with an horizontal aisle tracking cameras of the previously shown type are arranged. The cameras together form a tracking system of the proposed principle. The Area between two shelfs, for example between shelfs S1 and S4 is defined as the zones of interest. Accordingly, the shelfs contain a compartment in those zones of interest, in which special offers or other items are arranged advertising the product in the respective shelfs. A customer reaching this zone may be drawn to special offers presented in those zones of interest and may continue into one of the aisles containing the product which he is interested in.

Covering the various crossings by the proposed tracking system using multiple cameras defining multiple zone and multiple zones of interest enable the tracking system to obtain data for various purposes. For example, evaluating the time, in which a detected and tracked customer stays within a certain area (no matter whether it is within the zone of interest or between the shelfs in the unmonitored areas) provides the possibility of generating "heat maps" within the area under surveillance. Due to the tracking of person and its recognition due to the assignment of attributes, customer flow maps can be generated.

Figure 9:
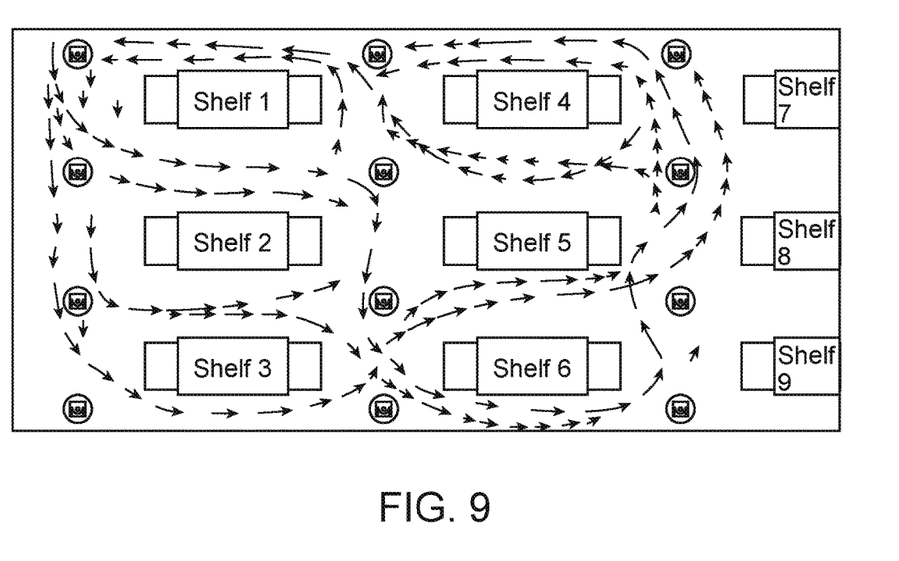
FIG. 9 shows a non-limiting result of a statistical analysis of various events obtained by the tracking arrangement according to some aspects of the present disclosure.

Such processed information in combination can be seen in Figure illustrating an exemplary embodiment of a heat map with a superimposed customer flow map. Brighter areas indicate a higher density of customers during the opening hours, thus indicating an increased interest in the customers. Such data in combination with products and its location in the shop may support the shop owner to arrange top seller products in those areas. Alternatively, sales of certain products may be improved if products are arranged close to those spots of higher density. Likewise, the flow map indicates, which of the aisle is more often used, or which ways towards a specific product group is most common. This information may support shop owners to control the customer flow to improve the customer's buying experience.

Figure 10:
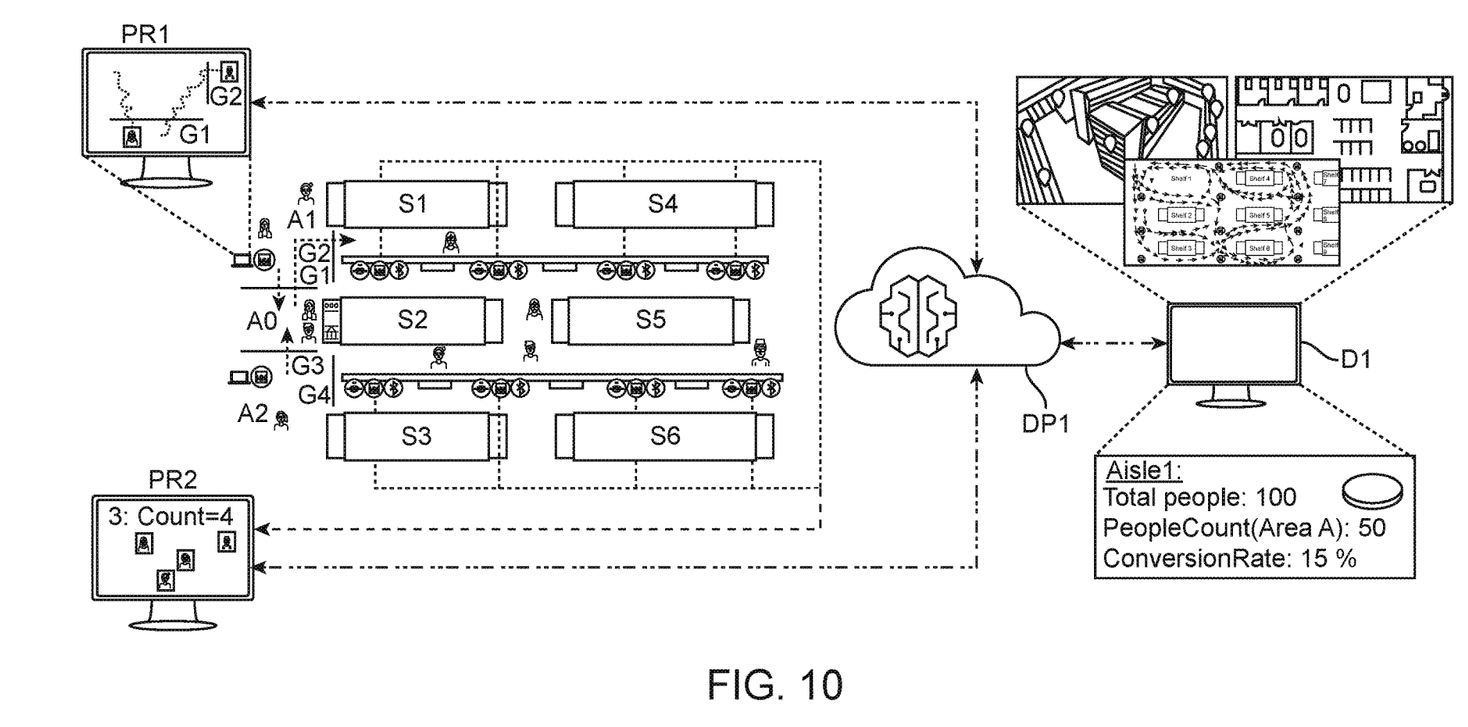
FIG. 10 shows a non-limiting embodiment of a tracking arrangement.

FIG. 10 shows an embodiment of a tracking arrangement according to the proposed principle. The tracking arrangement comprises one or more tracking systems of which one is illustrated therein. The tracking system is connected to a data processing system DP1 collecting the information provided by the tracking system when transmitting the event messages. The processing system is couple to the tracking system. It comprises one or more processors, volatile and non-volatile storage as well as functionality for statistical and analytical processing of the information. In some instances, the processing system can be located within the cloud being connected to the tracking systems via the internet. In some instances, the data processing system also controls the tracking systems; in other instances, such control is separated. Elements PR1 and PR2 illustrate examples of information obtained by the tracking system and transmitted to the data processing system DP1.

For example, PR1 illustrates the information concerning the gate counting events recorded by recognized objects when entering or leaving the zones under surveillance. PR2 provide information about the number of persons within the area of surveillance. Data processing system DP1 is coupled to a display D1 to visualize the results of statistical analysis of the information obtained. For example with respect to aisle 1, the information obtained by the tracking system is processed by the data processing system. The result is presented in D1, wherein out of a total number of 100 people 50 people went into aisle 1. However, it also shows the conversion rate of 15%. That is while 50% of the overall amount of people went into aisle 1, 15 of those may be triggered by special offerings in the zone of interest A0.

Referring back to FIG. 9 in this regard, the figure also illustrates a result of such statistical and analytical analysis of movement of various persons through leaves shortly afterwards.

Figure 11:
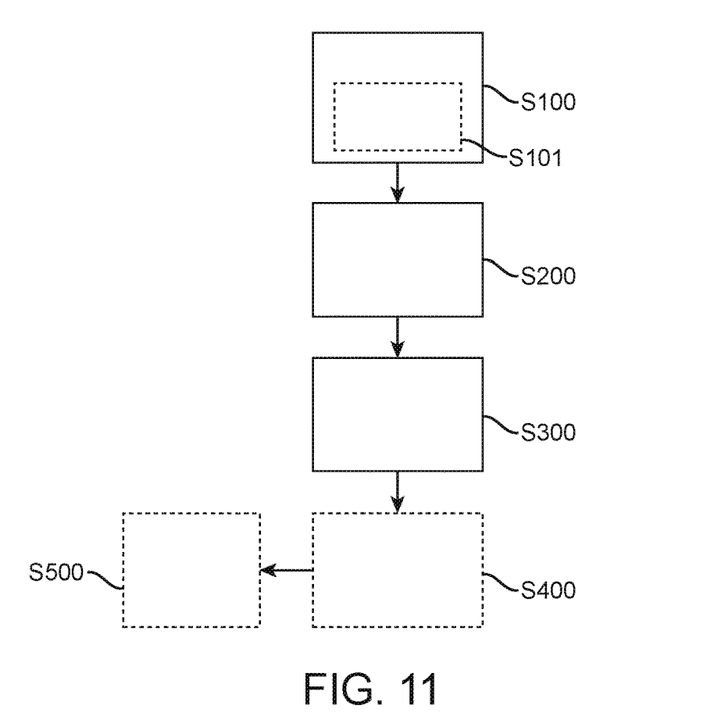
FIG. 11 shows an example of a method for tracking object within a field of view in accordance with some aspects.

FIG. 11 illustrates an example of the method for tracking objects within a field of view according to some aspects. The field of view comprising a first zone and an adjacent zone of interest, wherein at least two gates are associated with respective sides of the first zone within the field of view. In a first step S100 an object is detected when it crosses one of the at least two gates associated with the first zone. In other words, it is detected when an object enters through one of the gate into the respective zone. In step S200, the object it tracked throughout the first zone and the zone of interest. When the object leaves the first zone again through a dedicated gate of the at least two gates, a specific event message is generated in step S300 provided that the object was tracked from the point of entry into the zone of interest prior to leaving through the dedicated gate.

The method combined multiple gate crossing with an evaluation of the tracked object, namely whether the object has reached or stayed within a specific zone in the area under surveillance. In an optional step S400, a plurality of different event messages as previously described are collected. From the content of such collected event messages, statistical information are obtained in step S500.

Figure 12:
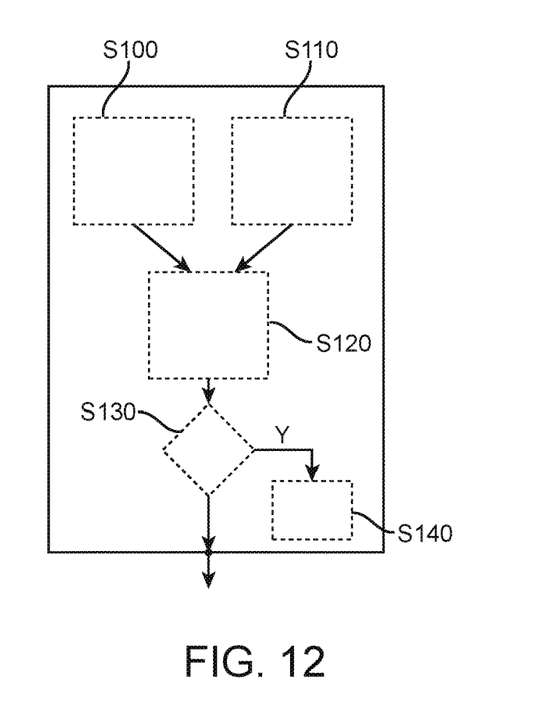
FIG. 12 shows another example of a method for tracking object within a field of view in accordance with some aspects.

FIG. 12 shows some further aspects of the proposed method. In this embodiment, several zones are under surveillance, including a first zone, a second zone and a zone of interest. First and second zone may not overlap. The zone of interest is adjacent to the first and the second zone. In step S100 similar to the previous example, a crossing of an object into the first zone is detected. Alternatively, at the same time or at some later stage an object is detected in steps S110 crossing the gate into the second zone. As a further alternative, a crossing into the zone of interest form a gate associated with the zone of interest can also be detected in step S100 or S110

When the object is crossing into one of the zones, attributes of the object are evaluated in step S120 and values of those attributes are assigned to the object. For example, the attributes to be evaluated can include size, height or shape of the object, color or certain patterns of the object's surface or certain signs attached to the object. If the object is a person, the attribute can include hair color, eye color, gender, height, patter and color of cloths and the like. Assignment of attributes and the evaluated values to the object enable the tracking of multiple object throughout the zones. It also provides a possibility for re-identification if the person leaves and reenters the zone.

In some instances, specific attributes are evaluated. For example, as shown in step S130, it is evaluated if a specific sign or pattern or secondary object is attached to the object. If such specific sign, pattern or predefined secondary object is found, then the object assigned to it is defined as an object to be ignored. The method then continues with step S140 and ignores the object from thereon. Consequently, no event message is generated, but tracking of the object or any entering and leaving event is ignored.

Figure 13:
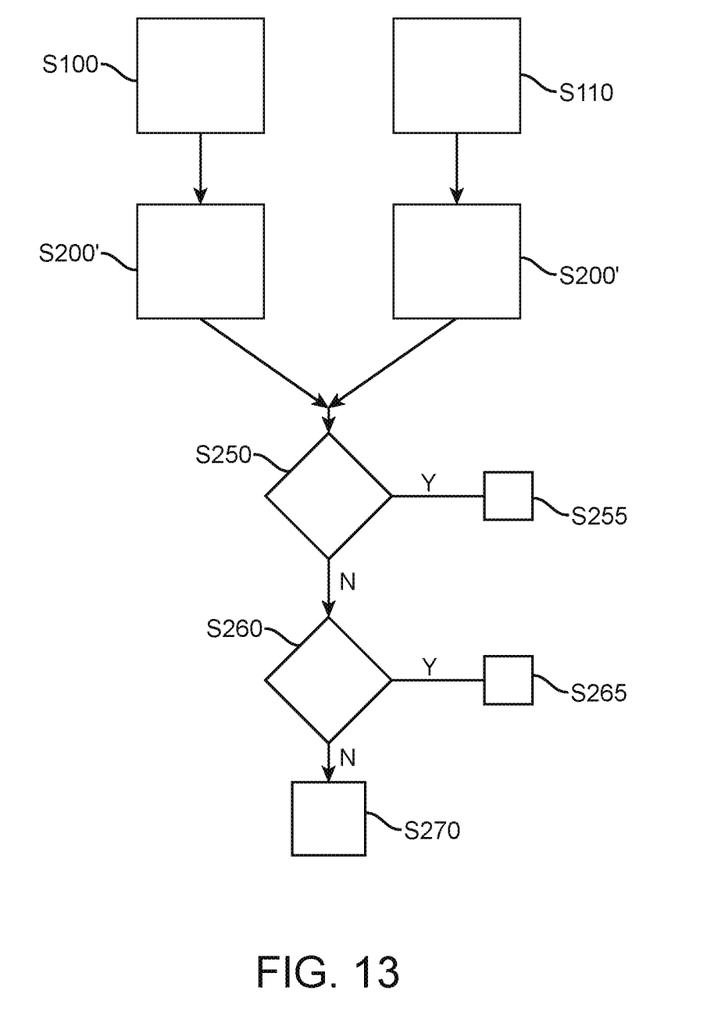

FIG. 13 illustrates a method, in which a plurality of cameras are responsible for monitoring certain zones. The cameras share a common zone. In steps S100 and S110, gate events are recorded when an object crosses into one of the first and second zone or into the commonly shared zone of interest. Further, the attributes of the objects are detected, evaluated and assigned to the object for later tracking and analysis purposes.

In step S200' several event messages are generated and stored for later purposes. These event messages includes information about the entry gate and the time when the object has enters one of the zones through the respective gate. Another event message is created when the object stays within the zone of interest for a dedicated period.

At some time the person will leave the zones under surveillance. The method then continues by recognizing this event in step S250 and evaluate whether the person left through the dedicated gate in the first zone. If this is the case, the method continues in Step S255 with generating and transmitting the event messages including the previously obtained information. Otherwise, the method continues with the next step S260 and evaluates, whether the person has left through the dedicated gate in the second zone. If that is the case, a corresponding event message is generated. If the person has left the zones through a non-dedicated gate, the method will continue in step S270 and generate an message indicating that the person has presumably no interest.

While the embodiments presented herein are referring to retail shops, warehouses and the like, the proposed principle is not limited thereto. The method of tracking as well as the proposed tracking system and arrangement can also be implemented for offices and industry. Some applications may relate to safety and security. For instance, exits to be used during fire or other hazardous events could be defined as dedicated gates. By using the proposed system, one could easily evaluate if all persons have left an office or a building in case of such fire events.

In some other instances, in an office the proposed method and system may provide space utilization statistics (e.g. stand in front of coffee machine, then use the sofas to drink coffee). In industrial applications, it may be used to check that the space is used properly (e.g. pass through the shoe cleaner before entering).

The proposed method, system and arrangement is easily extendable, for example by providing feedback to the user while the user is within a specific zone or exits through a dedicated gate. Information could also be provided, if the user enters through a specific gate into the zone.

In other instances, the system may reckon that too small zones mean lower accuracy in the computed statistics, which it communicates to the user during the configuration. In this regard, it should be noted that while the zones have been presented as mainly rectangles in the examples, the geometric form is not restricted thereto. Rather, the proposed concepts also allows for any shape of the zones, numbers and form of gates. Further, zones and gates may be configured dynamically. That is, the specification and definition including the location of gates and zones within the field of view can be changed and controlled by software. This provides a way for a general configuration of a system, which can be changed at a later stage very easily. Further, multiple configurations of gates and zones can be stored and re-used depending on the needs. In some example, a retail shop can have two slightly different configurations, the first being used during Monday to Friday and the second during Saturday, due to the different customer habits. A flexible way of defining gates and zones using software configuration also allows the shop owner for example to re-arrange offers or replace offers without the need of complete reconfiguring the system. In other instances, the configuration of such systems can be remotely controlled, including but not limited to cloud solutions and the like. Such configuration is not only restricted to the definition of gates and zones, but do also include changes in the statistical analysis or reconfiguring the event message provided by the system. For example, it may become important to provide additional information, e.g. the time people were staying in a specific zone.

The proposed system is easily expandable and flexible in terms of configuration, utilization and handling of the results.

REFERENCE LIST

A0 zone of interest
A1, A2 zones
A11, AT2, AT3 attributes
C1, C2 camera
D1 display
DP1 processing system
E1, E2, E3 event
FoV field of view
G1, G2, G3, G4 gates
G5, G6, G7, G8 gates
G22, G44 gates
O1, O4 object
PR1, PR2 processing results
SE, SE2 side of zone
S1-S8 shelf
T1, T2, T3 time
VO1, VO2 object of interest, offer
W1, W2 wall, obstacle

The invention claimed is:

1. A tracking system for tracking an object within a field of view, the field of view comprising a first zone and an adjacent zone of interest, wherein at least two gates are associated with respective sides of the first zone within the field of view, and wherein the tracking system comprises:
a first camera adapted to detect when an object crosses one of the at least two gates and track the object throughout the first zone and the zone of interest; and
a second camera configured to monitor the zone of interest and a second zone within the field of view and not overlapping with the first zone, the second zone being adjacent to the zone of interest;
wherein:
the first camera and/or the second camera is configured to associate at least two attributes to an object to recognize the object from another object within the first zone, the second zone and/or the zone of interest;
the second camera is configured to detect when the object crosses the second zone through one of the at least two gates associated with respective sides of the second zone and to track the object throughout the second zone and the zone of interest based on the at least two attributes of the object; and
the tracking system is configured to generate a first event message in response to the object being tracked from one of the at least two gates into the zone of interest and subsequently leaving the first zone through a dedicated gate of the at least two gates.

2. The tracking system according to claim 1, wherein the at least two gates are associated with respective sides of the first zone not adjacent to the zone of interest and/or a gate of the at least two gates is associated with a side of the zone of interest opposite the first zone.

3. The tracking system according to claim 2, wherein the first camera is configured to detect when an object crosses the at least two gates associated with a side of the zone of interest.

4. The tracking system according to claim 1, wherein the dedicated gate of the at least two gates is substantially perpendicular towards the side of the first zone adjacent to the zone of interest.

5. The tracking system according to claim 1, wherein the tracking system is configured to generate a third event message upon at least one of:
an object entering one of the first zone or the second zone and the zone of interest through one of the at least two gates;
an object staying within the zone of interest beyond a threshold of time;
an object leaving the first zone or the second zone through a gate not being the dedicated gate.

6. The tracking system according to claim 1, wherein one or more event messages comprises at least one of:
a time stamp when the event occurred;
camera identification;
a crossing direction of the object;
an identifier of the object;
at least two attributes associated with the object;
an encoded version of attributes to recognize the object;
direction of the object during the event.

7. The tracking system according to claim 1, wherein at least one side of the zone of interest not adjacent to the first zone and/or the second zone is blocked for movement of the object.

8. A tracking arrangement comprising:
one or more tracking systems according to claim 1, wherein the respective fields of view of each tracking system do not overlap; and
a data processing system configured to receive a plurality of signal events of the one or more tracking systems to obtain a statistical analysis of object.

9. The tracking arrangement according to claim 8, wherein the one or more tracking systems are arranged in a pre-determined structure.

10. A method for tracking objects with the tracking system of claim 1 within a field of view, the field of view comprising a first zone and an adjacent zone of interest, wherein at least two gates are associated with respective sides of the first zone within the field of view, the method comprising:
detecting when an object crosses one of the at least two gates associated with the first zone;
monitoring the zone of interest and a second zone within the field of view and not overlapping with the first zone, the second zone being adjacent to the zone of interest;
associating at least two attributes to an object to recognize the object from another object within the first zone, the second zone and/or the zone of interest;
detecting when an object crosses the second zone through one of the at least two gates associated with respective sides of the second zone and to track the object throughout the second zone and the zone of interest based on the at least two attributes of the object;
tracking the object throughout the first zone and the zone of interest; and generating a first event message in response to the object being tracked from one of the at least two gates into the zone of interest and subsequently leaving the first zone through a dedicated gate of the at least two gates.

11. The method according to claim 10, wherein the at least two gates are associated respective sides of the first zone not adjacent to the zone of interest and/or a gate is associated with a side of the zone of interest opposite the first zone.

12. The method according to claim 11, wherein the detecting comprises detecting when an object crosses the gate associated with a side of the zone of interest.

13. The method according to claim 10, wherein the dedicated gate of the at least two gates is substantially perpendicular towards the side of the first zone adjacent to the zone of interest.

14. The tracking system according to claim 1, wherein the at least two gates are associated with respective sides of the second zone not adjacent to the zone of interest and/or:
a gate of the at least two gates is associated with a side of the zone of interest opposite the second zone.

15. The tracking system according to claim 1, wherein the tracking system is configured to generate a second event message in response to the object being tracked from one of the at least two gates into the zone of interest and subsequently leaving the second zone through a dedicated gate of the at least two gates associated with respective sides of the second zone.

16. The tracking system according to claim 15, wherein the dedicated gate of the at least two gates associated with respective sides of the second zone is substantially perpendicular towards the side of the second zone adjacent to the zone of interest.

17. The tracking system according to claim 1, wherein the tracking system is configured to forego the creation of an event message in response to the detecting a predefined object or in response to detecting one or more predefined attributes associated with the object.

18. The tracking system according to claim 1, wherein at least two attributes comprise at least one of:
color of at least a part of the object;
pattern of at least part of the object;
signs attached to the object;
height or size of the object.

19. A tracking system for tracking an object within a field of view, the field of view comprising a first zone and an adjacent zone of interest, wherein at least two gates are associated with respective sides of the first zone within the field of view, and
wherein the tracking system comprises:
a first camera adapted to detect when an object crosses one of the at least two gates and track the object throughout the first zone and the zone of interest;
wherein:
the tracking system is configured to generate a first event message in response to the object being tracked from one of the at least two gates into the zone of interest and subsequently leaving the first zone through a dedicated gate of the at least two gates; and
the tracking system is configured to determine an impact of a special offer or advertisement based on an amount of time that the object stays in the zone of interest.

20. A method for tracking objects with the tracking system of claim 19 within a field of view, the field of view comprising a first zone and an adjacent zone of interest, wherein at least two gates are associated with respective sides of the first zone within the field of view, the method comprising:
detecting when an object crosses one of the at least two gates associated with the first zone;
tracking the object throughout the first zone and the zone of interest;
determining an impact of a special offer or advertisement based on an amount of time that the object stays in the zone of interest; and
generating a first event message in response to the object being tracked from one of the at least two gates into the zone of interest and subsequently leaving the first zone through a dedicated gate of the at least two gates.

* * * * *